US010670790B2

(12) United States Patent
Braithwaite

(10) Patent No.: US 10,670,790 B2
(45) Date of Patent: Jun. 2, 2020

(54) SYSTEM AND METHOD FOR ILLUMINATING AND IDENTIFYING AN OBJECT

(71) Applicant: Michael Braithwaite, Langhorne, PA (US)

(72) Inventor: Michael Braithwaite, Langhorne, PA (US)

(*) Notice: Subject to any disclaimer, the term of this patent is extended or adjusted under 35 U.S.C. 154(b) by 517 days.

(21) Appl. No.: 14/824,054

(22) Filed: Aug. 11, 2015

(65) Prior Publication Data
US 2017/0045803 A1    Feb. 16, 2017

(51) Int. Cl.
*F21V 8/00*    (2006.01)
*G03B 15/05*    (2006.01)

(52) U.S. Cl.
CPC .......... *G02B 6/0003* (2013.01); *G02B 6/0008* (2013.01); *G03B 15/05* (2013.01); *G03B 2215/0582* (2013.01)

(58) Field of Classification Search
CPC .............................................. G03B 2215/0539
USPC ........................................ 362/3–18, 551–582
See application file for complete search history.

(56) References Cited

U.S. PATENT DOCUMENTS

| | | | | |
|---|---|---|---|---|
| 5,579,429 A | * | 11/1996 | Naum | G02B 1/046 252/301.17 |
| 6,402,358 B1 | * | 6/2002 | Larimer | G02B 6/0006 362/575 |
| 7,146,084 B2 | * | 12/2006 | Atac | G02B 27/0172 362/557 |
| 7,712,906 B1 | * | 5/2010 | Larimer | G02B 6/0008 362/554 |
| 7,746,517 B2 | * | 6/2010 | Miller | H04N 1/02815 362/551 |
| 2003/0035048 A1 | | 2/2003 | Shipp | |
| 2005/0113641 A1 | | 5/2005 | Bala | |
| 2010/0182569 A1 | | 7/2010 | Artsyukhovich | |
| 2011/0043661 A1 | | 2/2011 | Podoleanu | |

* cited by examiner

*Primary Examiner* — William J Carter
(74) *Attorney, Agent, or Firm* — LaMorte & Associates P.C.

(57) ABSTRACT

An illumination and imaging system that is used to obtain enhanced detailed images of objects. The system utilizes a flash element that produces a flash of polychromatic light. A plurality of fiber optic elements are provided that terminate with output ends. At least some of the fiber optic elements are doped to be different colors. Consequently, when each fiber optic element receives the flash of polychromatic light from the flash element, that fiber optic element propagates and filters the polychromatic light to produce colored filtered light. The colored filtered light is directed toward the object being imaged by the camera. The illumination has small points of origin, different color characteristics and simultaneous short flash duration. The combination of colored, directional light sources enables the camera to image very fine details by enhancing surface texture and embedding the image with the color photometric stereo information.

14 Claims, 6 Drawing Sheets

SYSTEM AND METHOD FOR ILLUMINATING AND IDENTIFYING AN OBJECT

BACKGROUND OF THE INVENTION

1. Field of the Invention

In general, the present invention relates to systems and methods that are used to illuminate an object for inspection by a camera system.

2. Prior Art Description

The largest problem associated with obtaining a clear image of an object or area is one of proper illumination. In order to obtain a clear and reliable image that is void of image artifacts from reflected ambient light, the object must be illuminated with light that is brighter than that of the ambient background light, else reflections and/or shade regions can obscure the details of the object being imaged. However, background full spectrum sunlight can sometimes exceed a brightness or irradiance of 100 mW/cm$^2$. In order to overcome this level of ambient light, an object must be illuminated with a very intense flash. If the object being imaged is a person, or if a person is exposed to the flash, that person could be momentarily blinded by the intensity of the flash. Furthermore, a person would experience at least some physical discomfort from the light's intensity, especially by full spectrum white light outputted from a large aperture.

One solution that has been used to solve the problem of illumination is to illuminate objects with flashes of infrared light or deep blue light, instead of white light. The human eye is less sensitive to these bands of light as compared to the middle band wavelengths of visible light. In the prior art, infrared light is typically created with infrared LEDs, due to the commercial availability of these LEDs. However, a very large matrix of infrared LEDs would have to be used in order to surpass the infrared light contained in background sunlight. Furthermore, although the eye is far less sensitive to such infrared light, the use of infrared light greatly reduces the contrasts of the pattern being imaged as compared to broadband light. This is due to the fact that light produced by commercial LEDs is generally very narrowband, if not monochromatic. The small bandwidth of wavelengths being produced in combination with surface reflectance variances makes it more difficult to detect finely detailed patterns and texture in the image. Therefore, although the details of an object may be illuminated by LED light, the image obtained lacks much of the contrast detail needed for producing the richest image optimized for computer vision analysis.

Another problem associated with a large LED array that generates aggressive illumination is one of producing specularities. Specularities are the areas on an object that reflect the illuminated incident light back into the camera and cause an image saturation and obscuration of many details otherwise imaged. The reflected light appears as a white or a saturated area in the captured image, wherein no detailed information can be obtained. Physics governs that larger the solid angle of the illuminated light source area, the larger the specularity obscuration area that occurs within the image. Therefore, increasing the LED array to overcome ambient light intensity is counterproductive for maximizing the potential for capturing unobscured details.

The obvious solution to the above-identified problems is to eliminate background illumination and specularities by placing an object directly in front of a camera system in a light controlled environment. By enclosing an object in a light box, the object can be illuminated with highly diffuse light solving the many challenges of capturing unobscured, detailed images. This close-proximity imaging eliminates most ambient lighting problems and most specularities. Although controlled imaging may be appropriate for professional photographers at a photo shoot, such imaging techniques have little practical use when imaging objects and people in the real world where ambient light cannot be controlled. Nor is close proximity imaging practical for outdoor environments or naturally lit spaces where sunlight is prevalent and ever changing. Likewise, close proximity imaging has no applications in passive monitoring of moving objects, such as passing people, passing traffic or objects passing on an assembly line, where the object does not stop and face the camera to be imaged.

In order for a camera system to passively monitor a crowd, traffic or other moving objects including animals, the imaging camera must be focused at some preselected point. To avoid the complications, expense and reduced reliability of auto-focusing systems, the illumination system being used must be sufficient to illuminate the capture zone using a high F # lens that produces a sufficiently useful depth of field. The high level of illumination is compatible with the higher lens F # and produces a deeper static capture zone without an auto-focusing system. Different static capture zone designs are achieved by using different lenses designed to achieve various capture zone distances from several inches to beyond ten meters. The greater the static depth of field from the high F #, the more the auto-focusing system requirements are reduced, if not eliminated. It has proven difficult in the prior art to provide sufficient illumination throughout such an extended range without making the illumination flash either highly obvious or potentially harmful A need therefore exists for a system and method, whereby a usable image can be obtained regardless of worst-case ambient lighting conditions. Furthermore, a need exists for a system that illuminates to optimize the fine details for imaging an object embedded with enhanced information created by the directional illumination that enables photometric stereo methodologies for rendering three-dimensional models in a manner that is not obvious, optically annoying, and/or potentially harmful. These needs are met by the present invention as described and claimed below.

SUMMARY OF THE INVENTION

The present invention is an illumination system that is used to illuminate a detailed object that is being imaged by a camera. The illumination system utilizes a flash element that produces a flash of polychromatic light. At least one fiber optic element is provided in close proximity with the flash. The fiber optic element terminates with output ends. If multiple fiber optic elements are used, at least some of the fiber optic elements are doped to be different colors. Consequently, when each fiber optic element receives the flash of polychromatic light from the flash element, that fiber optic element propagates and filters the polychromatic light to produce colored filtered light. One important attribute of the present invention is a small light output aperture that causes highly directional light to be splashed onto the person/animal/object being imaged. Highly directional light enhances image information by Lambert's Cosine Law. Lambert's Cosine Law governs the intensity of light reflected from localized surfaces varies according to the orientation angles of the localized surface. Localized surface normal or orthogonal vector information can be revealed by computer vision analysis operating on the pixel luminance values embedded within the image from the directional illumination. Conversely, diffuse illumination being omnidirectional effectively negates the reflectance effect of Lambert's Cosine Law and thus does not generate surface normal information embedded with the image. Additionally, by using two or more different color illuminators with sufficient angular separation, color stereoscopic information embeds into the image which enables the capability of three-dimensional rendering of the person/animal/object from the single image using color photometric stereo techniques.

The colored filtered light is directed toward the object(s) being imaged by the camera. The illumination has small points of origin, different color characteristics and simultaneous short flash duration. This combines to enable the camera's sensor and Bayer filter to image very fine details while embedding colored, directional, and stereoscopic information into the image for computer vision analysis.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention imaging system can be embodied in many ways, the present invention system is particularly well suited for high-resolution identification systems where people, animals, or any objects are imaged in great detail, to determine three-dimensional surface geometry and identify intricate surface texture and patterns. The exemplary embodiments selected set forth some of the best modes contemplated for the invention. The illustrated embodiments, however, are merely exemplary and should not be considered limitations when interpreting the scope of the appended claims.

Figure 1:
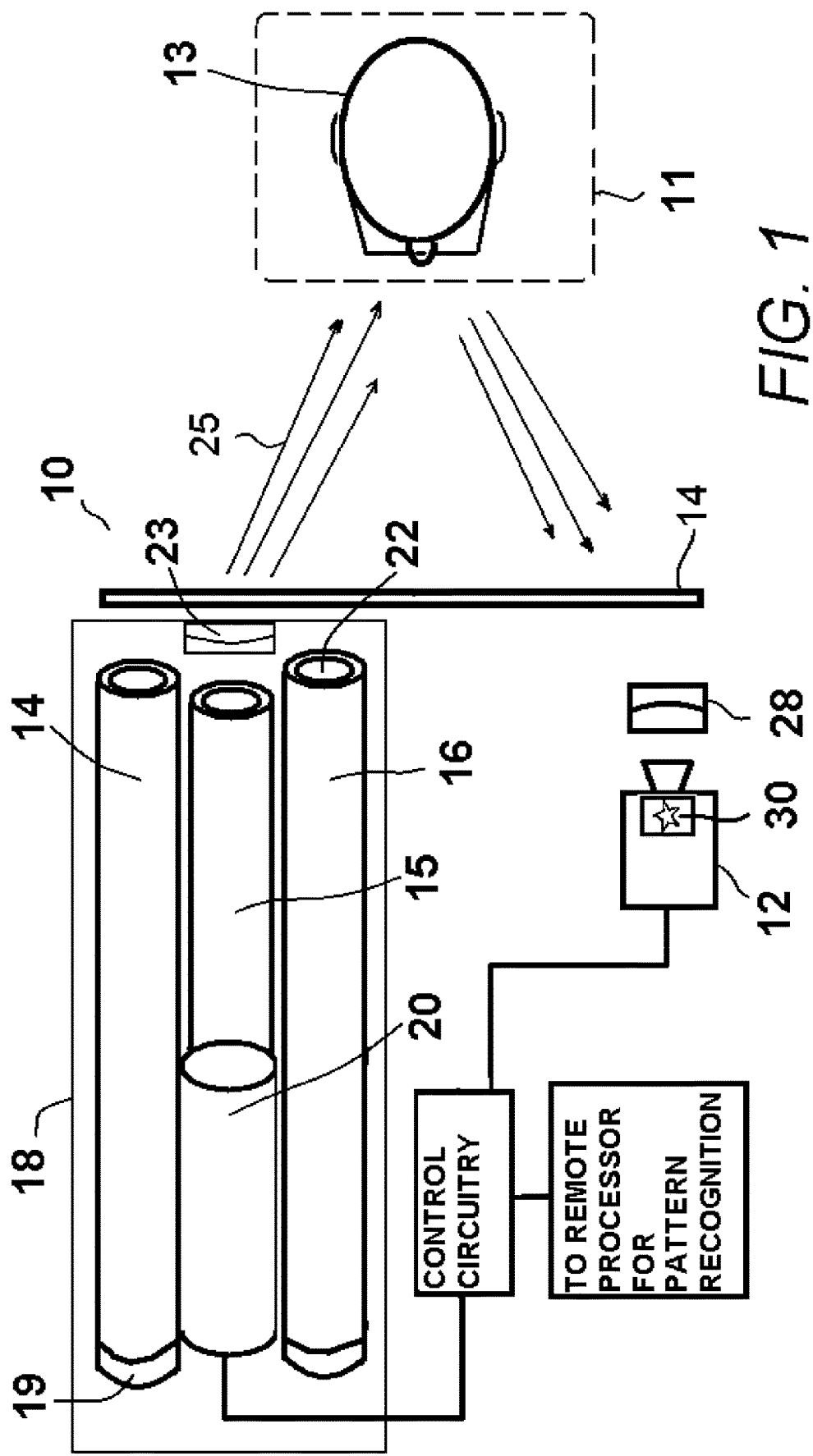
FIG. 1 is a schematic illustrating the electro-optical components of an imaging scheme containing a first exemplary illumination system.

Referring to FIG. 1, a schematic of the exemplary imaging system 10 is illustrated. The imaging system 10 is used to passively capture the image of a person/animal/object 13 as that person/animal/object 13 passes or is placed within a particular target zone 11.

An illumination unit 18 is provided that contains a flash element 20. The preferred flash element 20 is a Xenon or Krypton flash bulb. The flash element 20 creates a highly intense polychromatic flash of broadband white light for a short duration when activated. The image is captured using a camera 12. The target zone 11 may be near or far from the camera 12 and/or illumination unit 18. Regardless, the target zone 11 is a predetermined distance D1 from the illumination unit 18. This distance D1 determines many of the operating parameters of the illumination unit 18, as will be later explained.

One or more fiber optic elements 14, 15, 16 are provided. The fiber optic elements 14, 15, 16 are positioned to receive the light energy produced by the flash element 20. Once the polychromatic light is received by the fiber optic elements 14, 15, 16, the light is filtered and selected wavelengths propagate through the fiber optic elements 14, 15, 16 to their ends. Each of the fiber optic elements 14, 15, 16 has two ends. One end of each fiber optic element 14, 15, 16 is capped with a reflective cap 19 to ensure that most of the light energy transferred to each fiber optic element 14, 15, 16 is directed to the output ends 22 of those fiber optic elements 14, 15, 16. The fibers optic elements 14, 15, 16, therefore, channel and condense the Lambertian beam pattern emitted from the relatively larger surface area of the flash element 20 to the smaller output ends 22 of the fiber optic elements 14, 15, 16.

The fiber optic elements 14, 15, 16 are colored. The cores of the fiber optic elements 14, 15, 16 are doped with florescent or phosphorescent dyes. This enables the fiber optic elements 14, 15, 16 to function as spectral filters as they redirect the light energy from the flash element 20. Since the cores are doped with fluorescent dyes, the fiber optic elements 14, 15, 16 fluoresce as they receive light energy from the flash element 20. Due to the Stokes shift phenomenon of fluorescence, the florescence within the fiber optic elements 14, 15, 16 compensates for the optical loss due to absorption. As a result, the original light intensity and energy transferred is preserved by a florescence effect. In short, the greater the input intensity (the polychromatic light intensity emitted and absorbed by the florescent dye), the greater output intensity (the fluoresced intensity emitted within the spectral band).

Since florescence dyes are available over a wide spectral band of different colors, a desired color output band can be selected. By selecting and applying optical fiber elements 14, 15, 16 with florescent colored dye that outputs within a specific band, the fiber optic elements 14, 15, 16 effectively become a spectral filter to the original polychromatic, broadband light produced from the flash element 20.

In the illustrated embodiment, three fiber optic elements 14, 15, 16 are shown. The fiber optic elements 14, 15, 16 are preferably doped to be red, green and blue, respectively. Also, near infrared fluorescent dyes could also be used. The optical fiber elements 14, 15, 16 act as light pipes that efficiently move the light from the point of origin at the flash element 20 to a desired exit location. The mechanically flexible optical fiber elements 14, 15, 16 can be configured in many ways, which yields a benefit to a device designer. The fiber optic elements 14, 15, 16 have a small diameter (0.5~3 mm). As a result, several can be used in a small space, including one or more in any combination of red, green, blue, near infrared and also clear (white light). Many different florescent dyes are available for designing desired color bandwidths to output and mixing florescent dyes can yield the tailored bandwidth spectral output for each color. Listings of florescent dyes and their absorption and emission bands are known.

Multiple fiber optic elements 14, 15, 16 of different color-bands surround the flash element 20 and are excited simultaneously from a single flash. The multiple fiber optic elements 14, 15, 16 combine to become a multi-spectral band pass filter. The desired spectral band output is determined by applying the selected florescent fiber dye colors within the fiber optic elements 14, 15, 16. It will therefore be understood that the desired output color mixture can be tailored by proportionalizing the relative number and size of individual florescent fiber optic elements applied as larger diameter fibers output more light than smaller diameter fibers.

The output end 22 of each of the optical fiber elements 14, 15, 16 may be unterminated and therefore emit a natural beam width and intensity pattern related to its natural numerical aperture of the bare, unterminated fiber end. However, the output end 22 can be optically modified by adding a lens 23 or shaped end to condense or expand the beam width, therein optimizing the illuminated splash area for a given the camera to object distance. Alternatively, the fiber light exit end can reflect into a mirror surface to fold the beam pattern perpendicular to the fiber axis or otherwise angle the beam as desired toward the target. Use of a mirror preserves the small output aperture.

The use of optical fibers 14, 15, 16 doped in different colors causes the light beam 25 illuminating the object 13 to be multiphase. The combined area of the fiber optic elements 14, 15, 16 is small, having an area of between one square millimeter and one square centimeter. The output area of the light beam 25 is preferably directly proportional to the distance D1 between the target area 11 and the illumination unit 18. If the target area 11 is close to the illumination unit 18, then less light is needed and the output area can be kept small. Conversely, if the target area 11 is farther away from the illumination unit 18, more light is needed and the output area is larger.

The fiber optic elements 14, 15, 16 act as a band pass filter and, therefore, the wavelengths of light outside the selected range are substantially suppressed. The intensity of the filtered light beam 25 passing out of the fiber optic elements 14, 15, 16 is dependent upon multiple factors. These factors include the power of the flash element 20, the wavelength absorption characteristics of the fiber optic elements 14, 15, 16, and the size/shape and net output of the fiber optic elements 14, 15, 16. These factors are engineered so that the intensity of the beam 25 in the selected pass filter wavelength range surpasses that of ambient sunlight when reaching the target zone 11, yet minimizes both specularity size and impact, and human or animal perception of the flash. It will therefore be understood that if a person/object 13 were to stand or move within the target zone 11 when the flash element 20 flashes, that person/object 13 will be bathed in filtered light that surpasses that of sunlight within the filtered spectral range for the duration of the flash. The low eye responsivity to the spectral band is also coupled to very short duration flash, i.e. from 50 microseconds to 3 milliseconds, and a small emission area of the fiber optic elements 14, 15, 16. The combination of these three attributes yields a very low human or animal perception of the emitted light. Yet the emitted light overcomes the ambient light challenge completely.

It will therefore be understood that a person/object 13 can be flashed with filtered light with an intensity greater than the intensity of natural sunlight at that spectral range and the person or observer being illuminated would have little perception of the flash. If the illumination unit 18 was hidden in or near an illuminated sign or electronic display that emits light throughout the visible spectrum, it is probable that a person would not even perceive the flash of the filtered light due to the wash of other more visible light. If the flash were positioned off axis by more than ten degrees to the person's gaze direction, the flash is likely not perceived regardless of being hidden or disguised as human eye acuity substantially reduces a few degrees away from the gaze direction.

Since an abundance of supplied illumination allows the beneficial use of a high f/# lens with a small aperture, there naturally occurs diffractions in the light at the sensor plane. The diffraction pattern in the light can detract from the clarity of the image ultimately being captured. The use of filtered light minimizes diffraction interference patterns in the light beam, causing an increase of imaging resolution. As such, it will be understood that the use of the filtered light can create a clearer and sharper image revealing more detailed features than would pure white light at the same intensity. This is because the filtered light following the Rayleigh Criterion would cause less interference in the beams of light 25 providing sharper imaging through the lens aperture 30.

The camera unit 12 is an imaging camera with an objective lens assembly 28. The camera unit 12 can be a traditional commercial camera with good sensitivity to wavelengths of light being used or a specialized camera designed to have such sensitivity. The camera unit 12 has a lens aperture 30, as do most cameras. However, in the camera unit 12 of the present invention, it is preferred that the lens aperture 30 is star-shaped rather than circular shaped. The use of a lens aperture 30 with a more complex polygonal shape, such as a star or sunburst shape, can optimize the modulation transfer function (MTF) at the camera unit 12. This can significantly improve the optical resolution and thus the fine details of the image being recorded.

Figure 2:
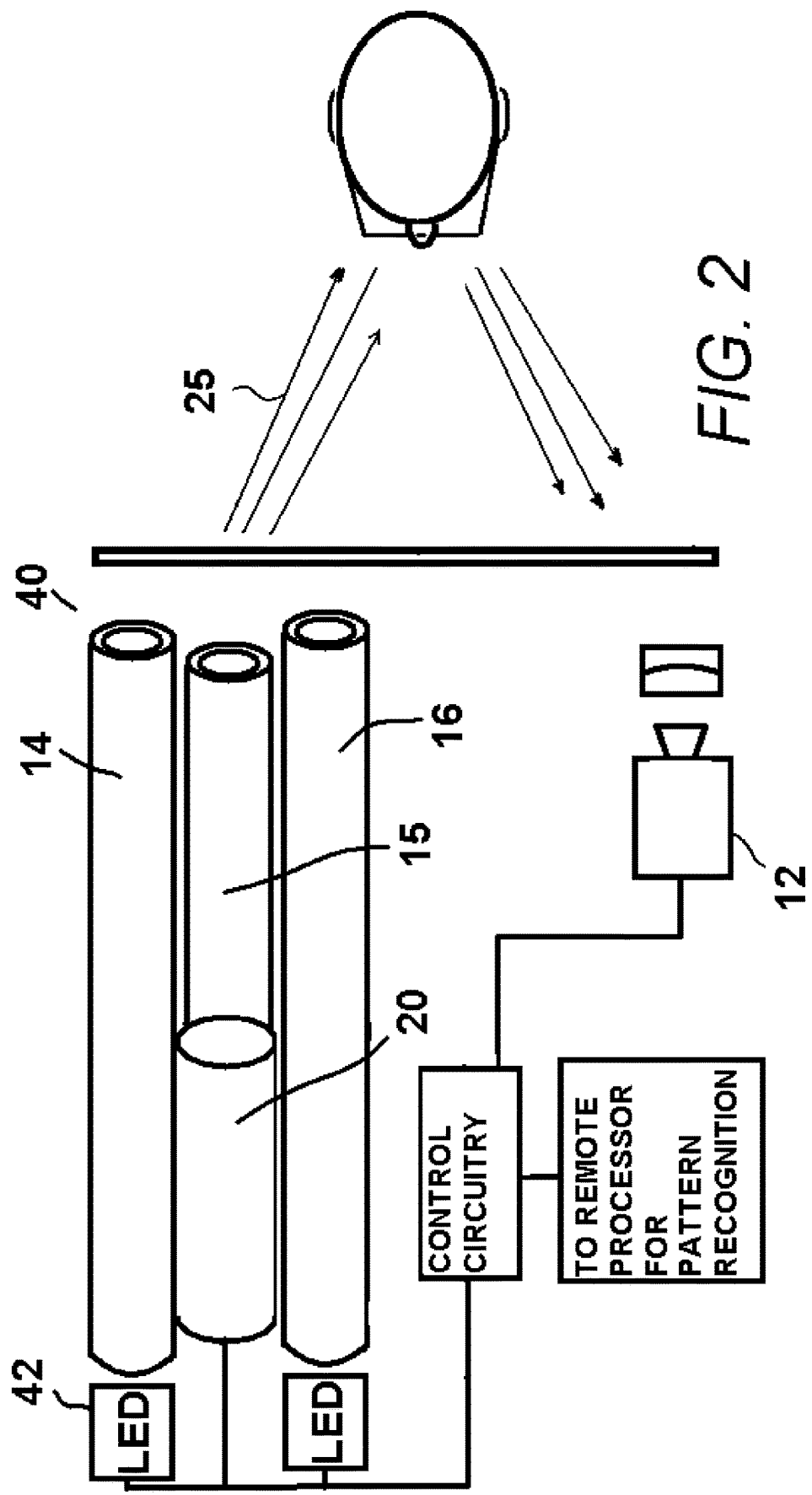
FIG. 2 is a schematic illustrating the electro-optical components of an imaging scheme containing a second exemplary illumination system.

Referring to FIG. 2, a modified imaging system 40 is shown that shares many features with the first embodied imaging system of FIG. 1. To avoid confusion, like elements are identified with like reference numbers. The imaging system 40 contains fiber optic elements 14, 15, 16 that are doped in different colors. The fiber optic elements 14, 15, 16 receive light from a common flash element 20. Each of the fiber optic elements 14, 15, 16 has an LED 42 that shines light into it. In this manner, each fiber optic element 14, 15, 16 receives light from both an LED 42 and the flash element 20. In this manner, one fiber end can be independently stimulated and controlled with an LED 42 for added light with control and illumination/imaging options. For example, a red LED can be used to stimulate a red florescent fiber optic element 14, and likewise a blue LED for a blue florescent fiber optic element 16. Moreover, since the florescent dyes in each of the fiber optic elements 14, 15, 16 can be mixed, a single narrowband LED output can be used to stimulate a wider band florescent output. Multiple florescent dyes can be applied so that an absorption and emission cascade occurs.

The LED stimulation and flash stimulation can occur independently for different illumination and imaging purposes. By terminating one end of each fiber optic element 14, 15, 16 to an LED 42, it allows independent control of both source color and illumination ON-duration for support of multiple different applications. For example, a fiber bundle can be fully capable of illumination for biometric purposes using the Xenon or Krypton flash bulb and additionally offer multiple different illumination modes for a variety of different imaging purposes. As a further example, one fiber end can terminate into an 880 nm IR LED, that is virtually not observable by the human eye and yet the camera 12 senses and images the illumination for a still or video application effectively imaging in the dark. Since the LED ON-time is not dependent upon the flash period (typically limited to 0.05~3 ms), the LED 42 and thus the fiber illumination output can be much longer, even continuous, until switched off. If color imaging is desired, different colored optical fibers can be lit, namely red, green and blue and used by the camera 12 for capturing chrominance information from an object. Optionally, for some applications, green or white light can be allowed to output onto the scene, or as desired, it can be selectively blocked from outputting into the scene. By selecting the illumination purpose(s) the selected illuminator design features provides multimodal functionality, e.g., biometric illumination, other specific purpose and/or general purpose illumination (portraits, object inspections, etc.).

The LED 42 can produce narrow-band excitation. However, by coupling it to a fiber optic element with multiple florescent dyes that converts and results to a broadband emission with an absorption and emission cascade, a broadband illumination output is produced from a narrow band input. This is preferred for eye safety.

There are packaging benefits with design flexibility where the source of the light is located within a device and yet the fiber readily routes the light to where the exit aperture is located. The thin (0.5~3 mm diameter) fiber optic elements 14, 15, 16 are flexible and offer design-constraint flexibility for a device, potentially lowering costs.

Relative light output for each color can be selected individually by choosing a desired diameter for the fiber optic elements 14, 15, 16. The light output from each fiber optic element 14, 15, 16 is proportional to the fiber's diameter. The greater the fiber core diameter, the greater amount of light absorbed and total spectral light re-emitted, and vice versa. For example, since a CMOS camera sensor to blue light (400~500 nm) can be ~4× the responsivity of near infrared (700~900 nm), then the blue diameter fiber can have a smaller diameter (~25%) than does the near infrared fiber diameter, yet still produces the equivalent luminance result to the blue pixels within the Bayer filter of similar chrominance information.

The exit location of each of the fiber optic elements 14, 15, 16 can be either co-located or separated by significant distance because the fiber internal losses are relatively low per unit distance. The preferred separations between the outputs of the fiber optic elements 14, 15, 16 are no less than $\frac{1}{20}^{th}$ the distance D1 (FIG. 1) between the illumination unit 18 and the person/object 13 being imaged. Such spacing in combination with the small output aperture generates directional lighting. Directional lighting includes applying Color Photometric Stereo (CPS) techniques that yield additional high-resolution imaging and three-dimensional utility with finely detailed performance benefits. Directional lighting increases imaging texture that benefits applications, such as iris imaging, face imaging and fingerprint imaging. This produces a direct performance benefit that is applied toward mitigating the losses in the optical modulation transfer function.

Color photometric stereo (CPS) techniques using multicolor stereo analysis are used to produce detailed imagery. Color photometric stereo techniques require color directional lighting from light sources that are physically separated at their output locations. Because a separate spectral filter beyond the sensor Bayer filter is not needed in the camera unit 12 or lens 28, color photometric stereo techniques are compatible for simultaneously imaging in different light bands and yet the system still copes with sunlight and shadows due to its high supplied illumination intensity. Since the fiber optic elements 14, 15, 16 are small, the output approaches that of a point source of light, which yields highest accuracy for color photometric stereo processing and computer vision applications.

In the embodiment of FIG. 1 and FIG. 2, the imaging systems are shown imaging a face. The systems are highly effective in imaging a face for a face recognition processing. However, due to the high level of detail that can be achieved using color photometric stereo techniques, the imaging systems can also image much finer details, such as the iris of a person eye, fingerprints, palm prints, or other such fine biometric parameters.

Figure 3:
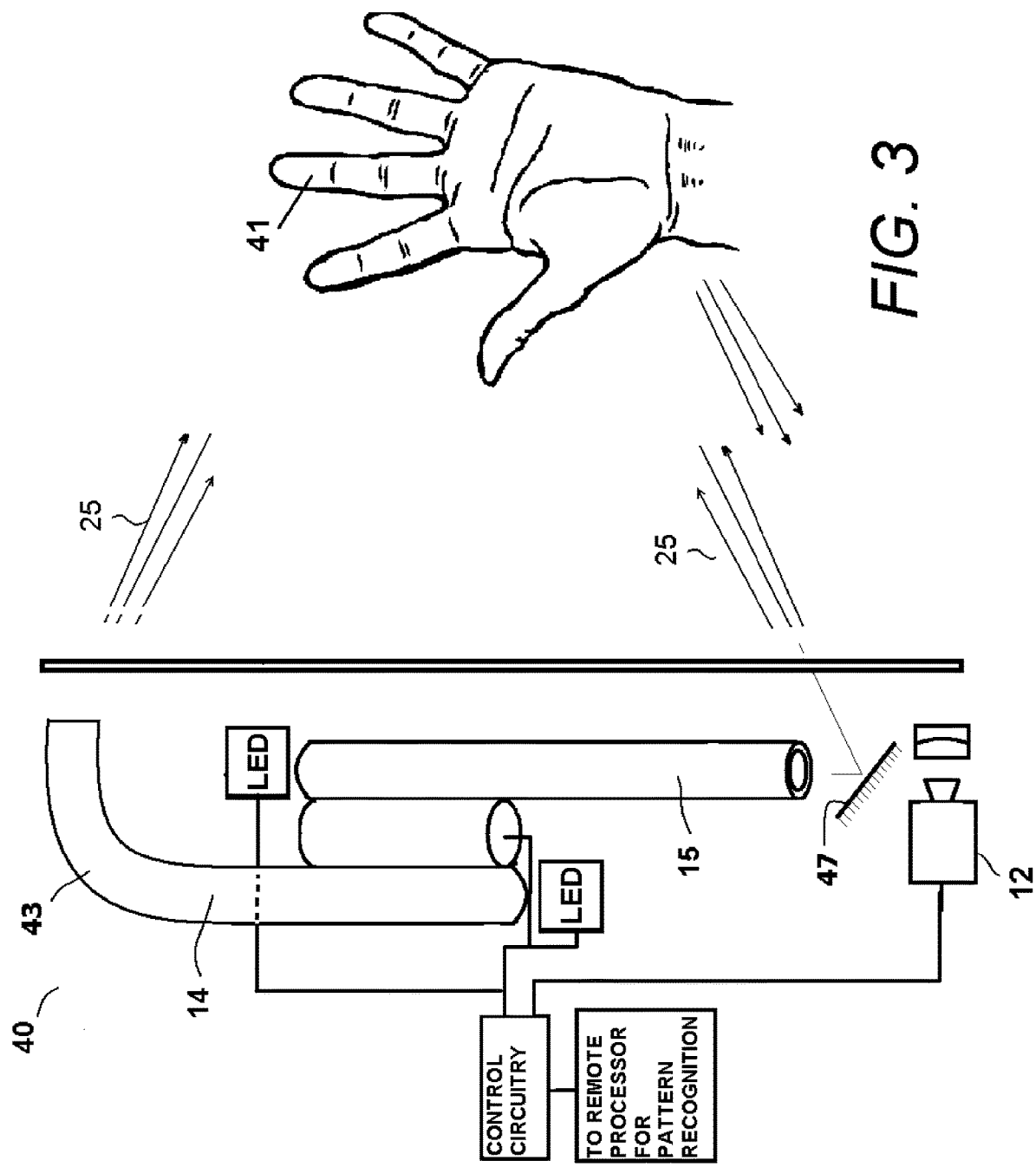
FIG. 3 shows the exemplary embodiment of the illumination system shown in FIG. 2 being used to illuminate and image a whole hand including fingerprints and palm print minutiae.

Referring to FIG. 3, another application of the imaging system 40 is shown. In this application, a person's hand 41 is imaged. This embodiment is also used to show how the present invention system can be made thin enough to fit inside a handheld electronic device.

In this embodiment, the fiber optics 14, 15 extend along the length of a handheld electronic device. The light can be directed forward either by producing a bend 43 in a fiber optic or using a folding mirror 47. Due to the different colored directional light being used to illuminate the hand 41 and the use of color photometric stereo techniques, three-dimensional geometry and texture details as fine as fingerprints and palm prints can be readily imaged.

Since the light beams 25 from the fiber optic elements 14, 15 originate at different points, the image can distinguish between three-dimensional objects, such as a physical hand 41, and two-dimensional objects, such as a picture of a hand. In this manner, it is much more difficult to fool the imaging system 40 if the imaging system 40 is being used for security identification, and counterfeit fraud prevention for imaged items lacking authentic, three-dimensional attributes.

Figure 4:
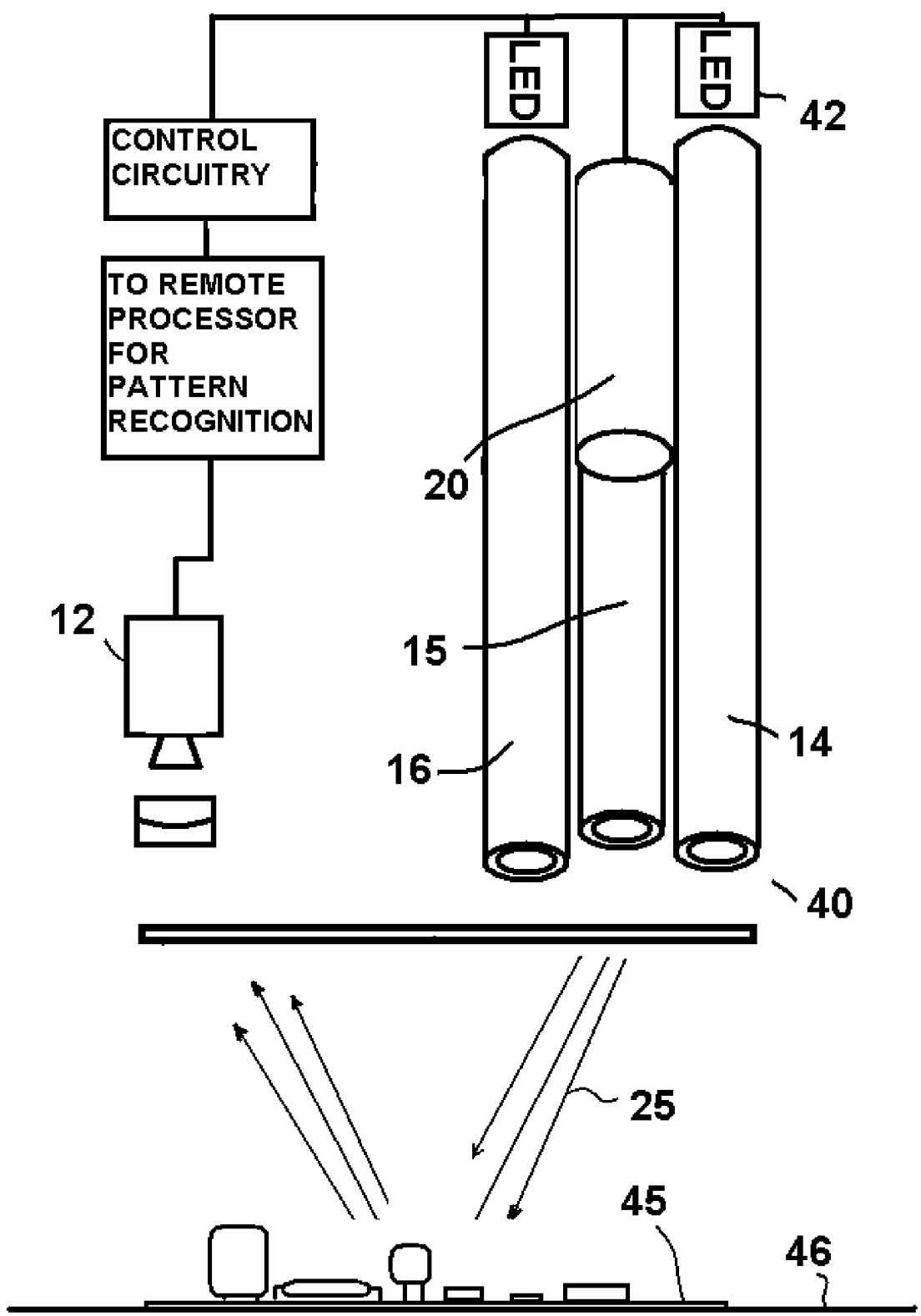
FIG. 4 shows the exemplary embodiment of the illumination system shown in FIG. 2 being used to illuminate an object passing on an assembly line.

Referring to FIG. 4, yet another application is shown. In this application, objects 45 passing on an assembly line 46 are being optically inspected. Due to the different colored directional light being used to illuminate the objects 45 and the use of color photometric stereo techniques, three dimensional geometry, and very fine detains can be readily imaged. As such, the imaging technique is highly useful in imaging objects with small details, such as circuit boards, where very small defects may occur. The system can also be used to detect color band errors of resistors on the circuit board, since the beam of light 25 used for the inspection is multiphase and the resulting light has a high color rending index. As a result, the light emitted by the illumination system 40 enables small changes in color to be readily perceived.

In all exemplary embodiments, the filtered light beam 25 is created using a wide spectrum flash element 20 that is filtered to a desired spectral profile. This ensures that light is incoherent throughout the selected spectral band and not coherent or very narrow band as would occur with a laser or LEDs. The light is broadband in the filter range. This broader band of light is needed in order to obtain good contrast in the image over a wide degree of reflectance variance. Furthermore, by using filtered flashed light, the numerous regulations regarding laser light or narrower band light use can be minimized since higher intensity safety thresholds apply to broadband illuminators.

Figure 5:
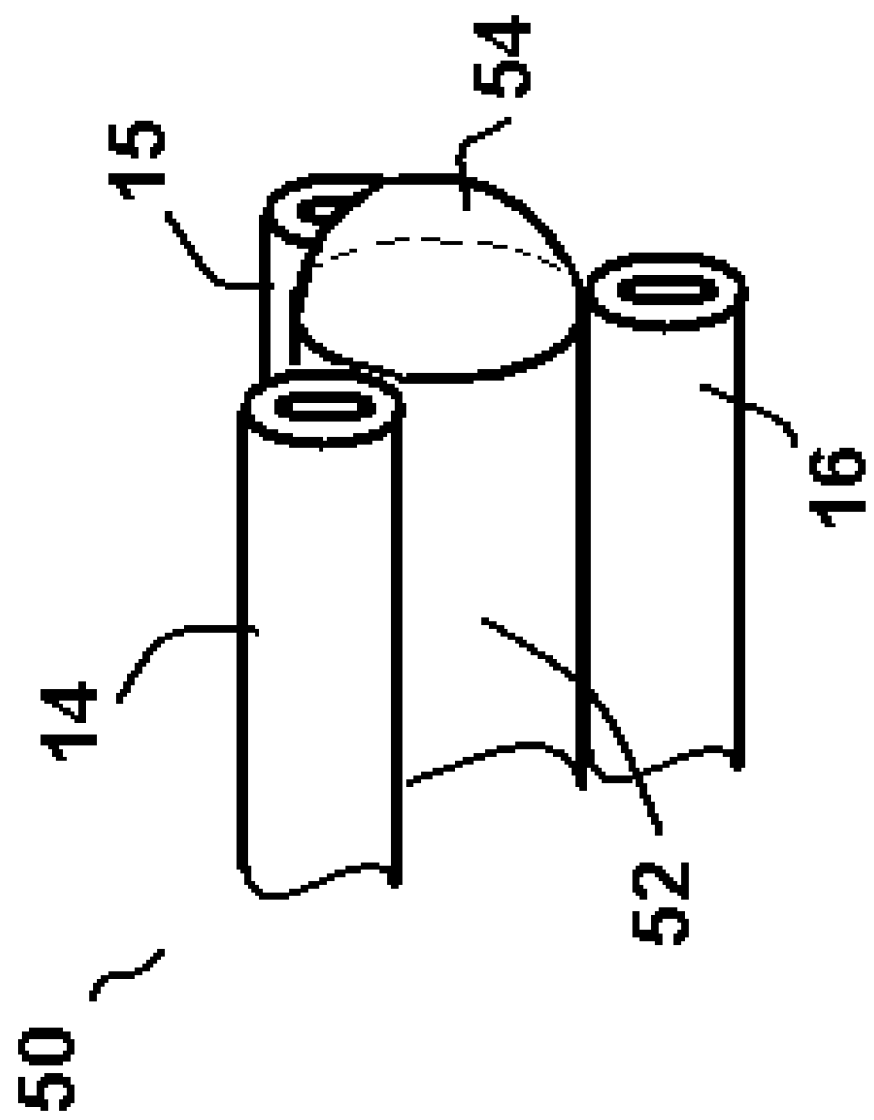
FIG. 5 shows an embodiment of the present invention illumination system being applied to a borescope.

The distances separating the fiber optic elements 14, 15, 16 depends largely upon the distance D1 that the light beam 25 travels from the fiber optic elements 14, 15, 16 to the person or object being imaged. For example, consider the embodiment presented in FIG. 5. In FIG. 5, the imaging end of a borescope 50 is shown. The borescope 50 may be used for industrial inspection purposes or it may be configured as an endoscope for medical inspection purposes. The borescope 50 has a flexible optical conduit 52 that is used to collect light for imaging.

Borescopes and endoscopes typically image objects that are only a centimeter or two in front of the imaging tip 54 of the optical conduit 52. The fiber optic elements 14, 15, 16 can be symmetrically positioned about the optical conduit 52. Although the fiber optic elements 14, 15, 16 may be spaced only a few millimeters apart, this angular separation is sufficient for color photometric stereo techniques, given the very short imaging distance.

Figure 6:
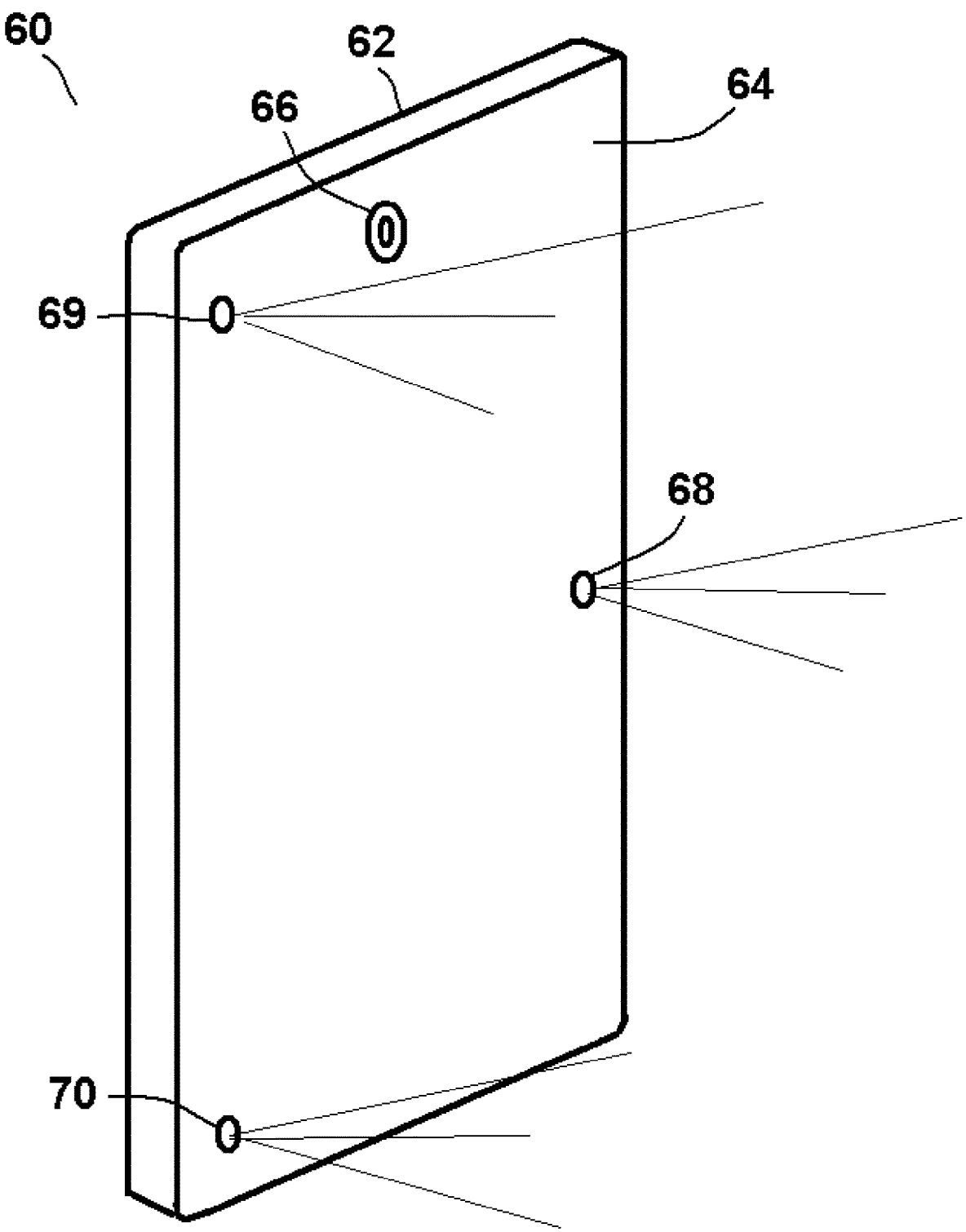
FIG. 6 shows an exemplary embodiment of a handheld electronic device containing a camera and a version of the present invention illumination system.

Referring to FIG. 6, an alternate embodiment of the present invention imaging system 60 is shown. In this embodiment, the imaging system 60 is incorporated into a handheld electronic device 62, such as a compact digital camera or a tablet or a smart phone that has a camera. In the illustrated embodiment, the handheld electronic device 62 is embodied as a smart phone.

The handheld electronic device 62 has a housing 64 with a camera port 66. Light ports 68, 69, 70 are disposed around the housing 64. The light ports 68, 69, 70 are as widely spaced as can be allotted by the dimensions of the housing 64. In the shown embodiment, three light ports 68, 69, 70 are provided. One light port 68 emits blue light. One light port 69 emits red light. The third light port 70 emits green light. The light ports 68, 69, 70 preferably operate using doped optical fibers and a single flash source, as has previously been explained. However, in certain modern devices, such as certain smart phones, there may not be enough external room to run the fiber optics. It will be understood that each light port 68, 69, 70 can have its own light source, wherein the various light sources are commonly controlled to flash at the same time.

In all embodiments, an imaging system is used to image the fine detains of any object, person or animal. The image is collected by a camera. The object, person or animal being imaged is illuminated by a specialized illumination system. The illumination system has multiple light output ports. At each of the light output ports, light having different color characteristics is output toward the object, person or animal being imaged. This illuminates the object or person in such a manner, that the camera can perceive very fine detail with a minimum of distortion, specularities and/or ambient light induced image losses.

It will be understood that the embodiments of the present invention that are illustrated and described are merely exemplary and that a person skilled in the art can make many variations to those embodiments. For instance, any flash elements that are capable of producing a wide spectrum flash in the intensity ranges needed can be used. All such embodiments are intended to be included within the scope of the present invention as defined by the claims.

What is claimed is:

1. An imaging system, comprising:
   a camera for imaging an object that is illuminated in a target area;
   a plurality of fiber optic elements, wherein at least some of said fiber optic elements are doped in different colors, wherein each of said plurality of fiber optic elements has a first end, a second end, and a side surface, wherein said first end terminated with a reflective cap and said second end is directed toward said target area;
   a flash element that produces a flash of polychromatic light wherein each of said plurality of said fiber optic elements receive said flash of polychromatic light at said side surface between said first end and said second end, filter said polychromatic light to produce filtered light, and emit said filtered light from said second end toward said target area, therein illuminating said object in said filtered light for imaging by said camera.

2. The imaging system according to claim 1, wherein said different colors of said plurality of fiber optic elements include blue and red.

3. The imaging system according to claim 2, wherein said different colors of said plurality of fiber optic elements further include green.

4. The imaging system according to claim 1, wherein said target area is a first distance from said camera.

5. The imaging system according to claim 4, wherein said second end of each of said plurality of fiber optic elements are each spaced apart by a distance that is no less than $1/20^{th}$ of said first distance.

6. The imaging system according to claim 1, wherein said flash element is a xenon flash bulb.

7. The imaging system according to claim 1, comprising:
   a handheld phone having a housing and a camera;
   a plurality of light output ports spaced about said housing and oriented in a common direction, wherein each of said plurality of light output ports simultaneously emit a flash of light having different color frequencies to illuminate an object being imaged by said camera.

8. The system according to claim 7, wherein each of said light output ports emits filtered light from a single common flash element.

9. An illumination system for illuminating an object being imaged by a camera, said illumination system comprising:
   a flash element that produces a flash of polychromatic light;
   light emitting diodes that produce colored light;
   a plurality of fiber optic elements having first ends, second ends, and a side surface, wherein at least some of said plurality of fiber optic elements receive said colored light from said light emitting diodes at said first ends, and wherein each of said fiber optic elements receives said flash of polychromatic light from said flash element at said side surface between said first end and said second end, filters both said polychromatic light and said colored light to produce filtered light, and emits said filtered light from said second ends;
   wherein said second ends are directed toward the object being imaged, therein illuminating the object in said filtered light.

10. The illumination system according to claim 9, wherein said different colors of said plurality of fiber optic elements are selected from a group consisting of red, green and blue.

11. The illumination system according to claim 10, wherein said plurality of fiber optic elements include fiber optic elements doped with florescent dyes.

12. The illumination system according to claim 9, wherein said object being imaged is a first distance from said camera.

13. The illumination system according to claim 12, wherein said second ends of said plurality of fiber optic elements are each spaced apart by a distance that is no less than $1/20^{th}$ of said first distance.

14. The illumination system according to claim 9, wherein said flash element is a xenon flash bulb.

* * * * *